UNITED STATES PATENT OFFICE.

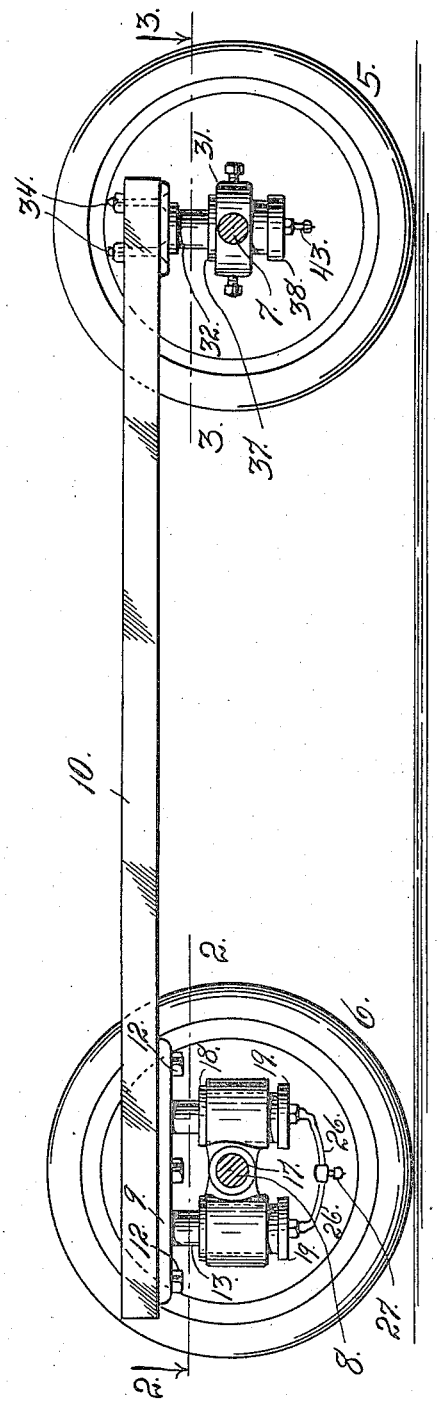

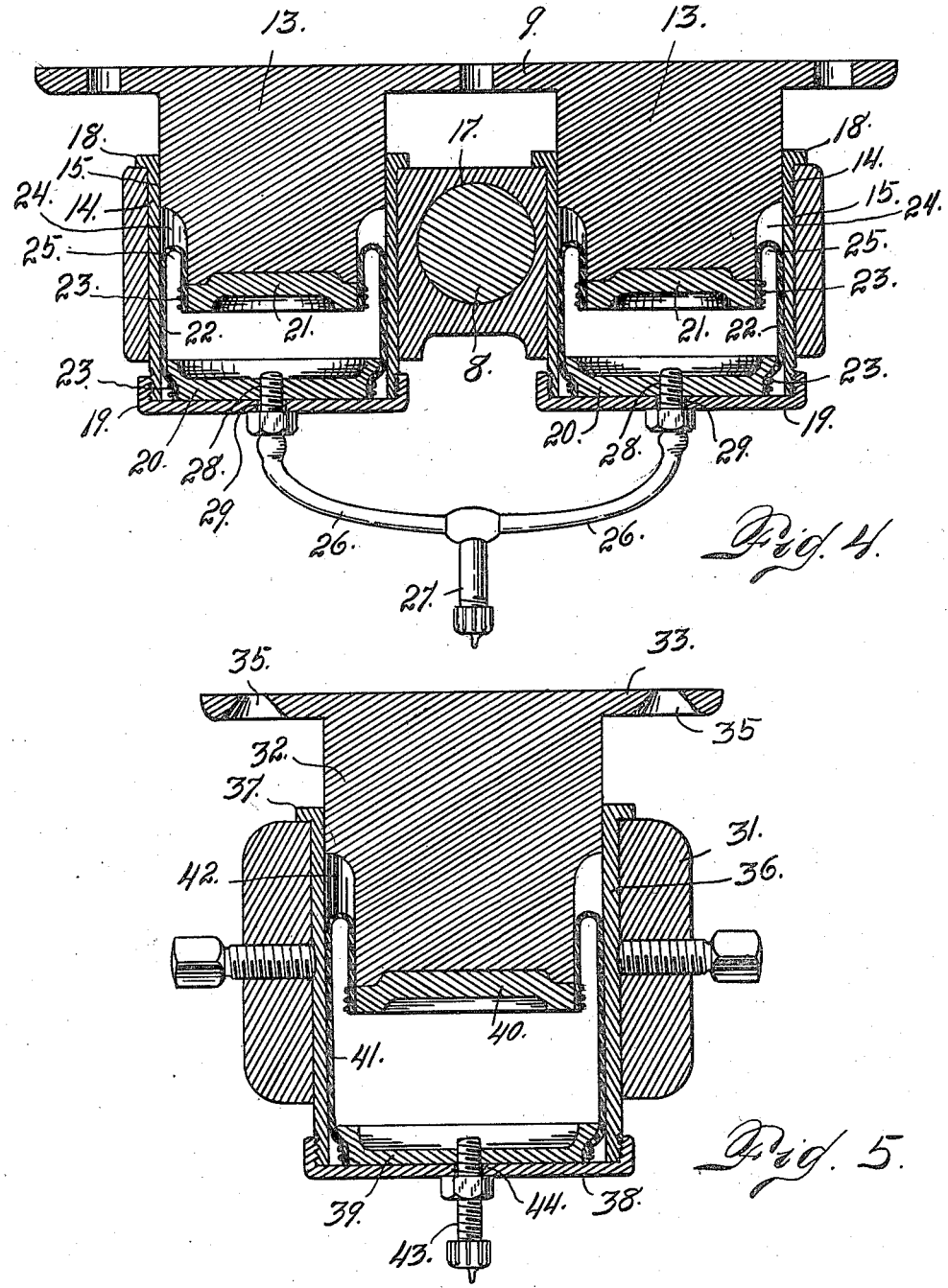

WALTER L. RICE, OF DENVER, COLORADO.

PNEUMATIC SPRING FOR VEHICLES.

1,160,321.  Specification of Letters Patent.  Patented Nov. 16, 1915.

Application filed December 8, 1914. Serial No. 876,047.

*To all whom it may concern:*

Be it known that I, WALTER L. RICE, a citizen of the United States, residing in the city and county of Denver and State of Colorado, have invented certain new and useful Improvements in Pneumatic Springs for Vehicles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in pneumatic springs for vehicles, being more especially intended for use with automobiles, but well adapted for use for all vehicles where springs or cushions are required.

The subject matter covered by this application is the same as that set forth in applicant's abandoned application, Serial No. 565,045, filed June 4, 1910, and allowed January 3, 1912.

My improved device constitutes a support for the vehicle body and the yielding members of which it is composed serve to lessen the necessity for tire resilience, whereby it becomes practicable to employ cushion or solid tires as distinguished from pneumatic tires on vehicles of the class indicated. But even if pneumatic tires are employed, my improved spring is a valuable auxiliary.

A single unit of my improved construction consists of two telescoping members between which my pneumatic spring or cushion is interposed, the same consisting of two heads, one of which is engaged by each member of the telescoping structure, the heads being connected by a flexible tube, one extremity of which is attached to each head of the cushion, the tube being inflated to any desired degree.

As illustrated in the drawing, one member of the telescoping structure is secured to the platform or body of the vehicle, while the other member is supported by the axle. Under ordinary circumstances four cushion members would be employed, each member being either duplex or single as may be desired, the said members being suitably arranged beneath the vehicle platform or body.

Having briefly outlined my improved construction, I will proceed to describe the same in detail, reference being made to the accompanying drawing, in which is illustrated an embodiment thereof.

In this drawing, Figure 1 is a side view of a vehicle equipped with my improved pneumatic cushions, the axles of the vehicle being shown in cross section. Fig. 2 is a horizontal section on the line 2—2, Fig. 1, looking downwardly. Fig. 3 is a section taken on the line 3—3, Fig. 1, looking downwardly. Fig. 4 is a vertical section taken through a duplex cushion member of my improved construction. This is a view taken on the line 4—4, Fig. 2, viewed in the direction of the arrow, the parts being shown on a larger scale. Fig. 5 is a similar section of a single member of the cushion, being a section taken on the line 5—5, Fig. 3, viewed in the direction of the arrow, the parts being shown on a larger scale.

The same reference characters indicate the same parts in all the views.

Let the numerals 5 and 6 designate the front and rear wheels of the vehicle respectively, and 7 and 8 the forward and rear axles thereof. As illustrated in the drawing the rear axle forms the support for two duplex pneumatic springs or cushions of my improved construction, while the front axle forms the support for two single members of the pneumatic form. Where the duplex structure is employed the axle may rotate. In this event, a base 9 is secured to the under surface of the vehicle platform 10 by means of bolts 12. Formed integral with this base or top plate, are two depending plungers 13 telescoping in cylinders 14 supported in openings 15, formed in opposite sides of a casting 16, which is also provided with a horizontally disposed opening 17 for the axle 8, the horizontal opening 17 being located intermediate the two vertical openings 15.

The cylinders 14 are provided with top flanges 18, which rest upon the top of the casting 16 surrounding the openings 15, their lower extremities being equipped with screw caps 19, which close the cylinders from below and form supports for the lower end plates 20 of my pneumatic cushion, which is also provided with top end plates 21, the two sets of plates 20 and 21 being connected by a relatively short flexible tube 22 impervious to air. As illustrated in the drawing, the extremities of the tube may be secured to the respective end plates 20 and 21 by wiring the same thereon as shown at 23. It is evident, however, that the tube may be secured to these plates in any other suitable manner.

Attention is called to the fact that the lower portions of the depending flanges 13 are cut away exteriorly as shown at 24, to allow the flexible tube to bend upon itself, whereby a space 25 is left between the reflex portions of the tube when my improved pneumatic spring is in use. The arrangement is supposed to be such that the upper portion of the tube is always bent upon itself, a narrow space, however, being left between the two parallel members below the bend so that there shall be no frictional wear between these parts. In order that both tubes may be inflated to the same degree, branch pipes 26 lead from a central pipe 27 carrying a check valve of ordinary construction, and which need not be described here in detail. An air pump may be connected with the part 27 and the two tubes of the duplex structure inflated to the desired degree, since the extremities of each tube remote from the valve member 27 terminates in tubular screws 28, which pass through plain openings 29 formed in the caps 19, and are threaded into the bottom plates 20 of my improved pneumatic cushions. In this form of the structure it is evident that the axle may rotate in the central portion of the device 16, or it may be stationary, as desired. It will also be observed that in this form of the device the two telescoping members of the structure straddle the axle.

In the form of construction shown in Fig. 5, being that also illustrated in connection with the front axle in Fig. 1, and also in Fig. 3, the pneumatic cushion is inserted in an opening 30 formed in a reinforced portion 31 of the axle 7, but with this exception, the single form of the device is substantially the same as each individual member of the duplex structure heretofore described. Hence the single form of the device consists of a depending plunger 32 which is provided with a flange 33 secured to the platform 10 by means of bolts 34 passed through openings 35. This plunger telescopes in a cylinder 36, having a top flange 37 engaging the reinforced part 31 of the axle, the lower extremity of the cylinder being equipped with a screw cap 38 closing the cylinder below and forming a support for the bottom plate 39 of my improved pneumatic cushion. This bottom plate is connected with the top plate 40 by means of a flexible tube 41 impervious to air, the tube being connected with the top and bottom plates 39 and 40 in the same manner as the corresponding parts 20 and 21 of the duplex form of the structure are connected, the plunger 32 being cut away as shown at 42 for the same purpose as the plungers 13 are cut away in the duplex form of the device. A check-valve-controlled screw-threaded member 43 is passed through an opening 44 formed in the cap 38, the said tube being threaded into the bottom plate 39 of the pneumatic cushion. This device is employed for inflating the pneumatic cushion for the same purpose as the inflating means are employed in the duplex form.

From the foregoing description the manner of assembling the parts of my pneumatic spring or cushion will be readily understood. The cylinder members 14 and 36 may be first dropped into the openings formed therefor as heretofore explained; after which the screw caps may be applied to the lower ends of the cylinders. The pneumatic springs may then be dropped into the cylinders and the inflating means connected, after which the plunger members 13 and 32 may be introduced. The tubes may then be inflated to the desired degree of pressure. The platform or body of the vehicle may then be applied and connected to the plungers; or any other suitable manner of assembling the construction and connecting the vehicle body may be employed.

Having thus described my invention, what I claim is,—

The combination with an axle and the body of a vehicle, of a cylinder carried by the axle, and a piston carried by the vehicle body telescoping within the cylinder, the lower extremity of the cylinder being closed, a pneumatic tube interposed between the cylinder and the piston, and having end plates closing the extremities of the tube, the lower end plate being connected with the bottom of the cylinder, and the piston resting upon the upper end plate, the piston being cut away on its sides to allow the tube to bend upon itself, substantially as described.

In testimony whereof I affix my signature in presence of two witnesses.

WALTER L. RICE.

Witnesses:
MAZE KIRBY,
A. EBERT O'BRIEN.